United States Patent
Kumar et al.

(10) Patent No.: US 11,569,759 B2
(45) Date of Patent: Jan. 31, 2023

(54) SYSTEM WITH ACTIVE FILTER FOR A BATTERY

(71) Applicant: Westinghouse Air Brake Technologies Corporation, Wilmerding, PA (US)

(72) Inventors: Ajith K. Kumar, Wilmerding, PA (US); Ravisekhar N. Raju, Wilmerding, PA (US); Patrick L. Jansen, Wilmerding, PA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 470 days.

(21) Appl. No.: 16/733,418

(22) Filed: Jan. 3, 2020

(65) Prior Publication Data

US 2021/0211067 A1    Jul. 8, 2021

(51) Int. Cl.
*B60L 15/00* (2006.01)
*H02M 7/5387* (2007.01)
*B60L 50/60* (2019.01)

(52) U.S. Cl.
CPC ......... *H02M 7/53875* (2013.01); *B60L 50/60* (2019.02); *B60L 2210/42* (2013.01); *B60L 2240/52* (2013.01)

(58) Field of Classification Search
CPC .. H02J 2310/40; H02J 2207/20; H02J 7/0063; H02J 1/02; H02M 7/53875; H02M 7/5387; H02M 7/4835; H02M 1/0093; B60L 2240/52; B60L 50/60; B60L 2210/42; B60L 53/24; Y02T 10/72; Y02T 10/70; Y02T 10/7072; Y02T 90/14
See application file for complete search history.

(56) References Cited

U.S. PATENT DOCUMENTS

| | | | |
|---|---|---|---|
| 9,042,131 B2 | 5/2015 | Barron et al. | |
| 9,887,616 B2 | 2/2018 | Bai et al. | |
| 10,468,877 B2* | 11/2019 | Miliani | H02M 1/15 |
| 2017/0005565 A1* | 1/2017 | Bai | H02M 3/33584 |
| 2017/0366082 A1* | 12/2017 | Liu | H02M 5/4585 |
| 2018/0006575 A1* | 1/2018 | Chapman | H02M 1/15 |
| 2019/0255960 A1* | 8/2019 | Töns | H02M 3/1582 |
| 2021/0188233 A1* | 6/2021 | Yuyama | B60T 8/92 |
| 2021/0379997 A1* | 12/2021 | Brüll | H02M 7/537 |

OTHER PUBLICATIONS

First Examination Report received for related Indian Patent Application No. 202014054853 dated May 6, 2022 (6 pages).
Tao, et al, "Multiport converters for hybrid power sources", IEEE Power Electronics Specialists Conference, Jan. 1, 2008, pp. 3412-3418 (7 pages).

* cited by examiner

*Primary Examiner* — Adi Amrany
*Assistant Examiner* — Esayas G Yeshaw
(74) *Attorney, Agent, or Firm* — The Small Patent Law Group LLC; Josef L. Hoffmann

(57) ABSTRACT

A system may be provided that may include a first battery, and an inverter coupled to the battery. The system may also include a first active filter including a first switch element, second switch element, third switch element, and fourth switch element. Each switch element may be coupled to the first battery or the inverter. The first, second, third, and fourth switch elements may be configured to increase or decrease an applied voltage or current of the first battery.

20 Claims, 14 Drawing Sheets

SYSTEM WITH ACTIVE FILTER FOR A BATTERY

BACKGROUND

Technical Field

The present disclosure relates to a system with an active filter for a battery.

Discussion of Art

In applications such as electric vehicles, hybrid vehicles, or energy storage systems, batteries are typically connected to the system direct current (DC) bus through a DC-DC converter. The DC-DC converter controls power flow to/from the battery and decouples the battery from current ripple that may propagate from other switching power converters connected to the system DC bus. However, the DC-DC converter can involve significant added cost and power because the DC-DC converter needs to process the full power flow in the path of the battery.

An alternative method connects the battery directly to the system DC bus which can vary in voltage depending on system conditions and battery state of charge. This avoids the cost of a DC-DC conversion stage. However, the battery is exposed to switching frequency ripple components that may be present on the system DC bus. As one example, in a vehicle application, the vehicle's propulsion system traction invertor may be subject to such switching frequency ripple components. This can lead to added power losses, heating in the battery, and degrade battery performance and life.

FIG. 1 shows a simplified schematic of a system fed by a battery string. The battery is, in this case, connected to a traction inverter DC bus through an inductance that is inherent to the connecting cables and/or is part of an added component for filtering.

FIG. 2 shows waveforms for the battery current, battery voltage and three-phase motor currents for operation with an inductance between the battery and the inverter dc bus as illustrated in FIG. 1. The battery carries significant ripple current with the current, even reversing direction multiple times during a motor fundamental frequency cycle.

Addressing this significant ripple is problematic. If a larger inductor is provided, resonance can occur. The resonant condition can be difficult to avoid if the inverters in the system are operated over a varying range of frequencies, as would be common for traction drives. In addition, the larger inductor can be sizeable, difficult to accommodate in tight spaces, and expensive and heavy.

BRIEF DESCRIPTION

In accordance with one embodiment, a system may be provided that may include a first battery, and an inverter coupled to the battery. The system may also include a first active filter including a first switch element, second switch element, third switch element, and fourth switch element. Each switch element may be coupled to the first battery or inverter. The first, second, third, and fourth switch elements may be configured to increase or decrease an applied voltage or current of the first battery.

In accordance with one embodiment, a control system may be provided that may include a controller including one or more processors. The one or more processors may be configured to monitor an electrical excitation signal to a first battery, and operate an active filter coupled between the first battery and an inverter to increase or decrease an applied electrical excitation signal of the first battery.

In accordance with one embodiment, a system may be provided that may include a first battery, a capacitor coupled to the battery, and an inverter coupled to the battery and configured to provide a motive force to system a vehicle. The system may also include an active filter that may include a first switch element, second switch element, third switch element, and fourth switch element. Each switch element may be coupled between the first battery and inverter. The first, second, third, and fourth switch elements may be configured to increase or decrease an applied current or voltage to the first battery.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a system for reducing ripple current with a system that includes a battery coupled to a converter. In an example, the system may be a drive for a vehicle that includes a battery coupled to an inverter. The system includes an active filter coupled between the converter and battery to reduce ripple current in the system. The filter can be an H-bridge that may be coupled to one or more strings of batteries. A controller may then monitor electrical excitation signals related to the inverter and the battery, and in response to detecting differences between the signals, the applied current of the battery may be varied to reduce the ripple current. In particular, the controller maintains the applied current of the battery relatively constant to provide a significant reduction in ripple current.

Figure 3:
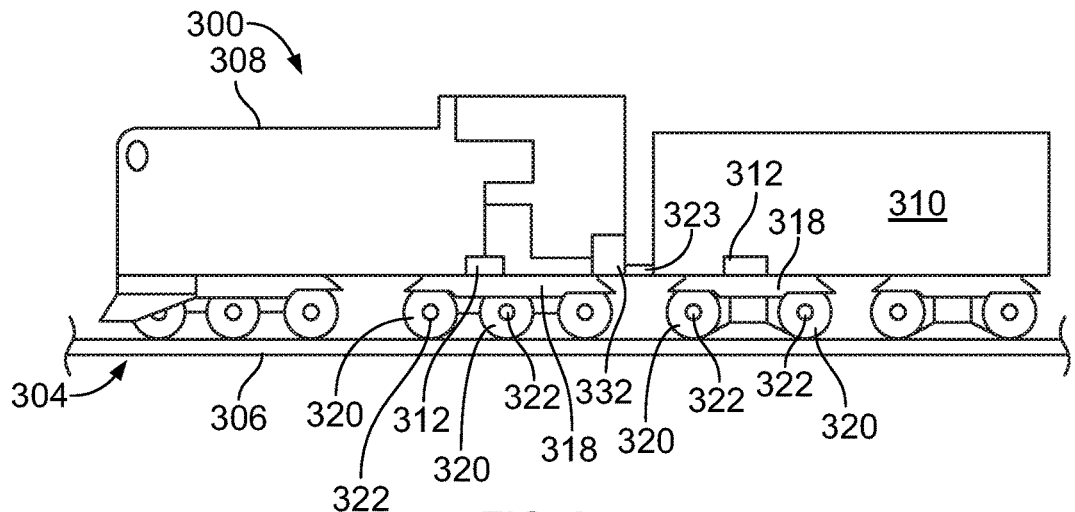
FIG. 3 illustrates a schematic diagram of an example vehicle system.

FIG. 3 illustrates a schematic diagram of a vehicle system 300. The vehicle system may be configured to travel along a route 304 on a trip from a starting or departure location to a destination or arrival location. The vehicle system includes a propulsion-generating vehicle 308 and a non-propulsion-generating vehicle 310 that are mechanically interconnected to one another to travel together along the route. The vehicle system may include at least one propulsion-generating vehicle and optionally, one or more non-propulsion-generating vehicles. In examples, the vehicle may be a hybrid locomotive, hybrid truck, or the like. In another example the vehicle may be a "battery only" powered vehicle.

The propulsion-generating vehicle may be configured to generate tractive efforts to propel (for example, pull or push) the non-propulsion-generating vehicle along the route. The propulsion-generating vehicle includes a propulsion subsystem, including one or more traction motors, that generates tractive effort to propel the vehicle system. The propulsion-generating vehicle also includes a braking system 312 that generates braking effort for the vehicle system to slow down or stop itself from moving. Optionally, the non-propulsion-generating vehicle includes a braking system but not a propulsion subsystem. The propulsion-generating vehicle may be referred to herein as a propulsion vehicle, and the non-propulsion-generating vehicle may be referred to herein as a car. Although one propulsion vehicle and one car are shown in FIG. 3, the vehicle system may include multiple propulsion vehicles and/or multiple cars. In an alternative embodiment, the vehicle system only includes the propulsion vehicle such that the propulsion vehicle is not coupled to the car or another kind of vehicle.

In the illustrated embodiment, the vehicle system may be a rail vehicle system, and the route may be a track formed by one or more rails. The propulsion vehicle may be a locomotive, and the car may be a rail car that carries passengers and/or cargo. Alternatively, the propulsion vehicle may be another type of rail vehicle other than a locomotive. In an alternative embodiment, the vehicle system may be one or more automobiles, marine vessels, aircraft, mining vehicles, agricultural vehicles, or other off-highway vehicles (OHV) system (e.g., a vehicle system that is not legally permitted and/or designed for travel on public roadways), or the like. While some examples provided herein describe the route as being a track, not all embodiments are limited to a rail vehicle traveling on a railroad track. One or more embodiments may be used in connection with non-rail vehicles and routes other than tracks, such as roads, paths, waterways, or the like.

In the example of FIG. 3, the vehicles of the vehicle system each include multiple wheels 320 that engage the route and at least one axle 322 that couples left and right wheels together (only the left wheels are shown in FIG. 3). Optionally, the wheels and axles are located on one or more trucks or bogies 318. Optionally, the trucks may be fixed-axle trucks, such that the wheels are rotationally fixed to the axles, so the left wheel rotates the same speed, amount, and at the same times as the right wheel. The vehicles in a vehicle system may be mechanically coupled with each other, such as by couplers. For example, the propulsion vehicle can be mechanically coupled to the car by a coupler 323.

The coupler may have a draft gear configured to absorb compression and tension forces to reduce slack between the vehicles. Although not shown in FIG. 3, the propulsion vehicle may have a coupler located at a rear end of the propulsion vehicle and/or the car may have a coupler located at a front end of the car for mechanically coupling the respective vehicles to additional vehicles in the vehicle system. Alternatively, the vehicles in a vehicle system may not be mechanically coupled with each other, but may be logically coupled with each other. For example, the vehicles may be logically coupled with each other by the vehicles communicating with each other to coordinate the movements of the vehicles with each other so that the vehicles travel together in a convoy or group as the vehicle system. While the example embodiment of FIG. 3 illustrates a vehicle, the system may also be used in stationary applications or devices, including a utility system with battery storage, or any stationary system or device utilizing battery storage.

Figure 1:
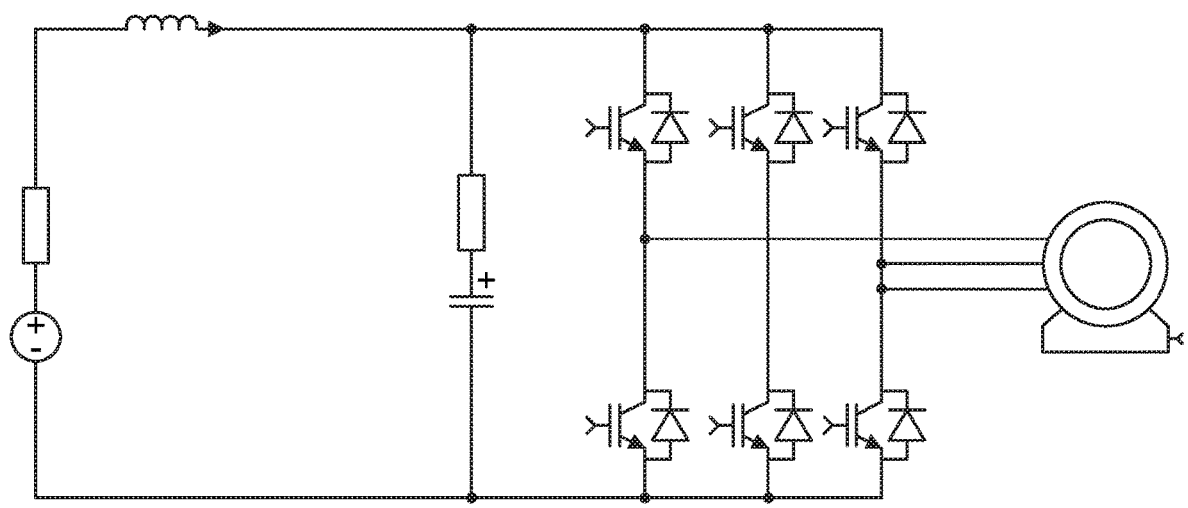
FIG. 1 illustrates a prior art schematic view of a system.
Figure 2:
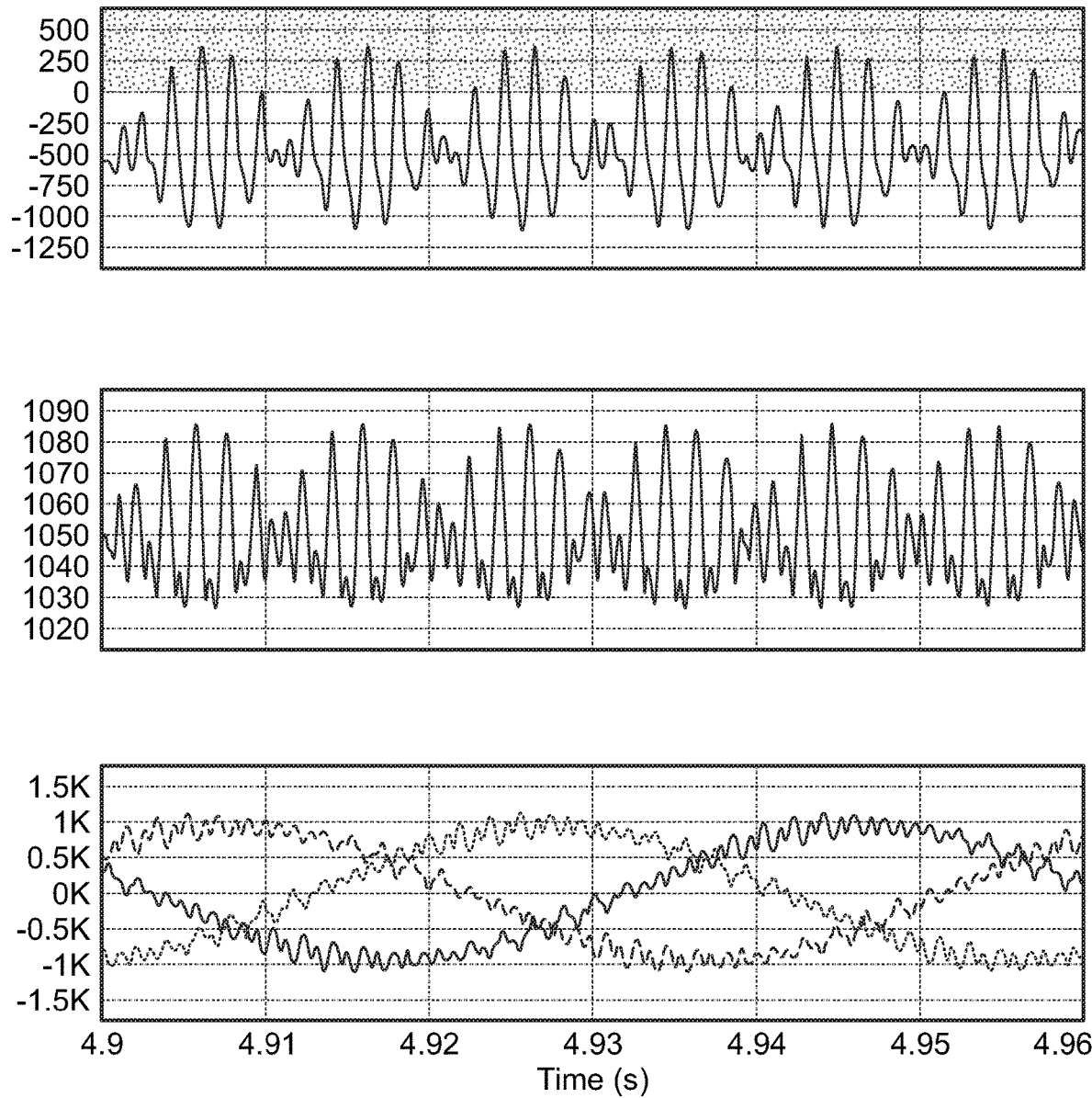
FIG. 2 illustrates a graph of voltage and current over time for an inverter of the prior art system of FIG. 1.
Figure 4:
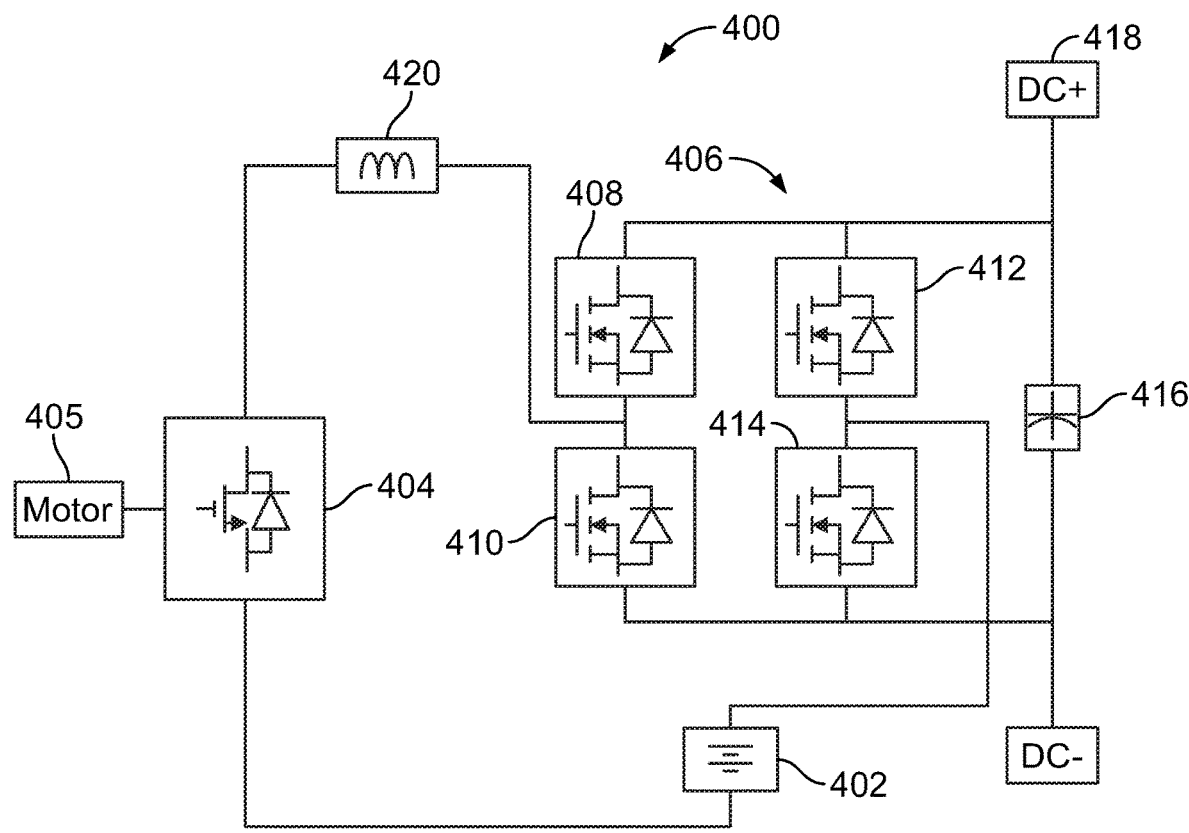
FIG. 4 illustrates a schematic diagram of an example system.

FIG. 4 illustrates a system 400. In one example, the system may be an electric drive system, a hybrid drive system, stationary system such as a utility system that includes battery storage, etc. The system includes at least one battery 402 that provides an input for a converter such as an inverter 404 coupled to the battery. While in this example embodiment only one battery is illustrated, a bank of batteries may be provided. The bank of batteries may be coupled in a series arrangement, in a parallel arrangement, include strings of batteries, where the strings have batteries coupled in a series arrangement and the strings themselves are coupled in a parallel arrangement, or the like. Similarly, the inverter may include plural switching elements such as metal oxide semiconductor field effect transistors (MOSFETs), insulated gate bipolar transistor (IGBTs), silicon carbide (SiCs) semiconductors, other semiconductor or transistors, etc. In one example the inverter may be a traction inverter used to provide an input for a motor 405 that provides a motive force for a vehicle. Even though an inverter is shown in the figure it is understood that these could be choppers, PWM rectifiers, diode rectifiers, multi-level inverters etc. While not illustrated for the purpose of simplifying FIG. 4 for explanation, similar to the system of FIG. 1, the system of FIG. 4 may include a direct current (DC) link capacitor that receives current as well.

Coupled between the at least one battery and inverter is an active filter 406. The active filter may generally be an H-bridge with at least a first switching element 408, second switching element 410, third switching element 412, and fourth switching element 414. The switching elements are arranged in the H configuration as illustrated, though in additional example embodiments additional sets of switching elements may be coupled to the four switching elements. (FIG. 6) In particular, when additional strings of batteries in parallel are presented, additional sets of switching elements may be utilized as well be described in further detail herein. The active filter may also include a capacitor 416 that receives an input from a direct current voltage source 418. The capacitor may store and provide energy to the first active filter.

The active filter operates at a higher pulse width modulation (PWM) frequency compared to the DC bus ripple frequency. In one example, the PWM frequency may be ten times the DC bus ripple frequency. The active filter may be configured to increase or decrease an applied voltage or current of a first battery. In particular, when inverter voltage is above the battery voltage, the capacitor and DC voltage source may be coupled in series to the inverter to decrease the voltage applied to the battery. To couple the capacitor and DC voltage source in series, the first switching element and fourth switching element are turned on, while the second and third switching elements are turned off. Alternatively, when the inverter voltage is below the battery voltage the capacitor and DC voltage source may be coupled in series to increase the voltage applied to the battery by turning on the second switching element and third switching element. In addition, by having first and third, or by having second and fourth elements the inverter voltage can be directly passed to the battery. Therefore, the battery voltage could be due to one of the (1) inverter voltage, (2) inverter voltage+capacitor voltage, (3) inverter voltage−capacitor voltage. The selection of these three voltages along with the inductance that may be used by the H-bridge to control the ripple current. By providing continuous switching using the active filter, the voltage applied to the at least one battery is maintained relatively constant, significantly reducing current ripple produced by the battery. In addition, the DC voltage source needed to provide the functionality may be a low voltage source. In one example, the DC voltage source may be 100V or less. While a simple H-bridge is shown, it is understood other forms like multilevel bridges and multiphase bridges can be used as well.

In one example, an inductor 420 may be coupled between the active filter and the inverter. The inductor may function to additionally reduce ripple current being inputted into the inverter. The inductor may be provided in addition to the inductance that is provided in the wires of the battery and in all the interconnection cables and busbars.

Alternatively, a DC voltage source does not need to be provided. Instead, the voltage differential between the battery and a dc link that includes the capacitor may be used to charge the capacitor with enough energy to address the energy needed for at least one cycle of the inverter ripple, and to address losses in the system.

Figure 5A:
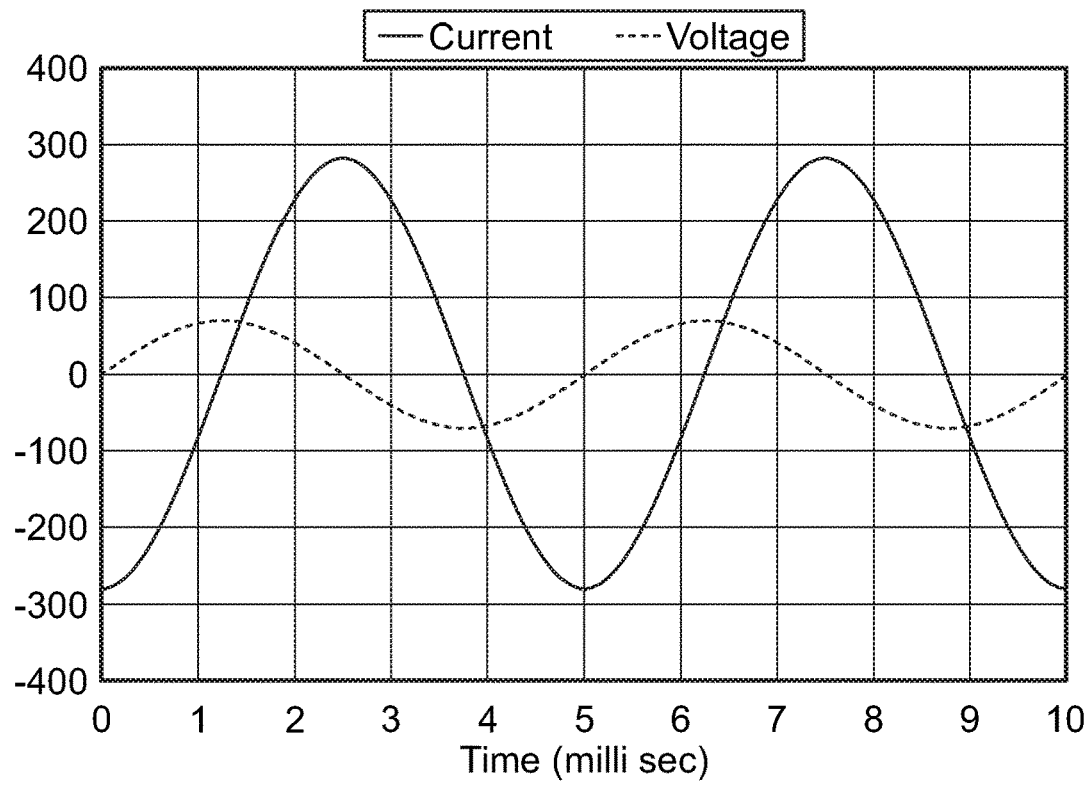
FIG. 5A illustrates a graph of current and voltage over time of a system not using an active filter.

FIG. 5A illustrates a graph of current and voltage over time when an active filter is not being utilized in a system. The assumptions made for making the plot is that a 200 HZ ripple is provided with a 50 volt root mean square (50 V RMS) ripple. A 200 uH inductance with a 20 kHz pulse width modulation (PWM) control is also assumed. As a result, the ripple voltage is +/−70 volts (V) while the ripple current is +/−280 Amps (A). These numbers are used just for illustration.

In other example applications the voltage magnitude and the ripple frequency may vary depending on the drive speed, drive power, drive switching frequency, drive mode of operation, etc. In addition, there are multiple frequencies present at the DC bus of the system. For example, in square wave operation, or a six step operation, of a system all multiples of a $6^{th}$ harmonic of the motor are present on the DC bus (6th, $12^{th}$, 18th etc. harmonic of the motor fundamental). The DC (constant) voltage is also not shown and is assumed to be understood. The resistance terms which provide voltage drop and losses are also ignored for illustration. In addition, the average or DC current and voltages are not shown. For example, in the example embodiment of FIG. 5A the AC voltage at the inverter terminal at 2 milliseconds of time is approximately 40V. However, if the average battery voltage is approximately 1000V, the inverter voltage will be 1040V out of which 1000V is the DC portion and 40V is the AC (ripple portion) and only the AC portion is shown in FIG. 5A for clarity. Similarly, at 2 millisecond the AC current is around 230 A. Therefore, the actual battery current will be around 730 A if the average (DC) battery current is 500 A. As for the voltage only ripple current is shown for clarity.

Figure 5B:
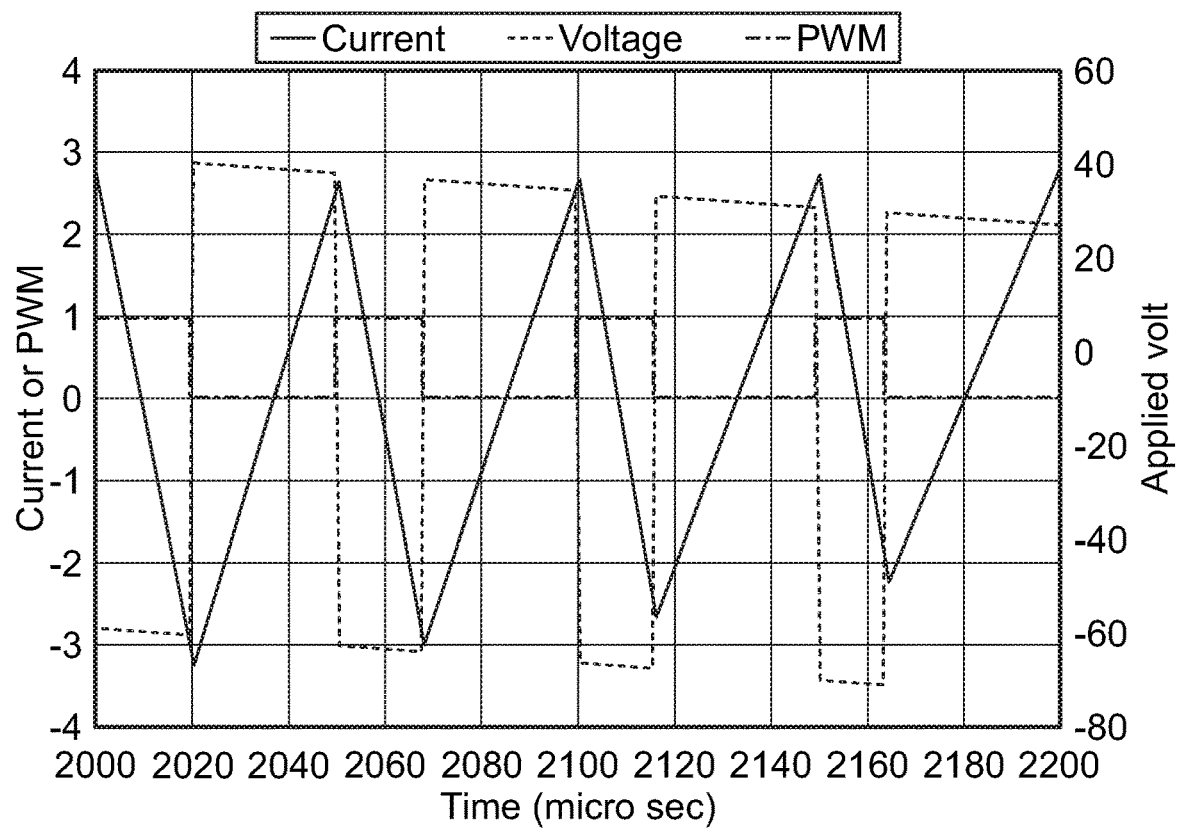
FIG. 5B illustrates a graph of current and voltage over time of a system using an active filter.

FIG. 5B illustrates the system of FIG. 5A utilizing the active filter. Again, for exemplary purposes only, the assumption is a 200 µH inductance with a 20 kHz PWM control. As illustrated, the ripple current may be reduced to only +/−3 Amps, or nearly hundred times less than the Amps when the active filter is not utilized in the system. During the period 2000 sec to about 2020 µsec the H-bridge turns on the first and fourth switch, thereby reducing the voltage applied to the battery and driving the current down from about +3 A to about −3 A as shown in FIG. 5B. During the period from about 2020 sec to 2050 µsec, the H-bridge turns on first and $3^{rd}$ switch which uses the inverter voltage (which is higher than battery voltage during this time), thereby increasing the battery current from about −3 A to +3 A. The average voltage subtracted from the dc source by the H-bridge is therefore a function of this duty cycle (20 µsec out of 50 µsec) and the capacitor voltage. In addition, the PWM frequency may be increased to further reduce the current. To this end, because in operation the system may operate efficiently with a greater ripple than +/−3 Amps, the inductor size, and consequently cost, may be reduced. For example, a 50 µH inductance could be used for a 20 kHz frequency and only a +/−12 Amp ripple current would result. If needed, the frequency could be increased to 50 KHz with a 50 µH inductance to provide a +/−5 Amp ripple current. Regardless, because of the active filter, the ripple current is significantly reduced, providing for improved functionality and greater design flexibility. The size and cost of the inactive components may be varied as well. In addition, there may be a significant reduction in ripple current to the battery, thereby reducing the heating in the battery and improving battery life.

Figure 6A:
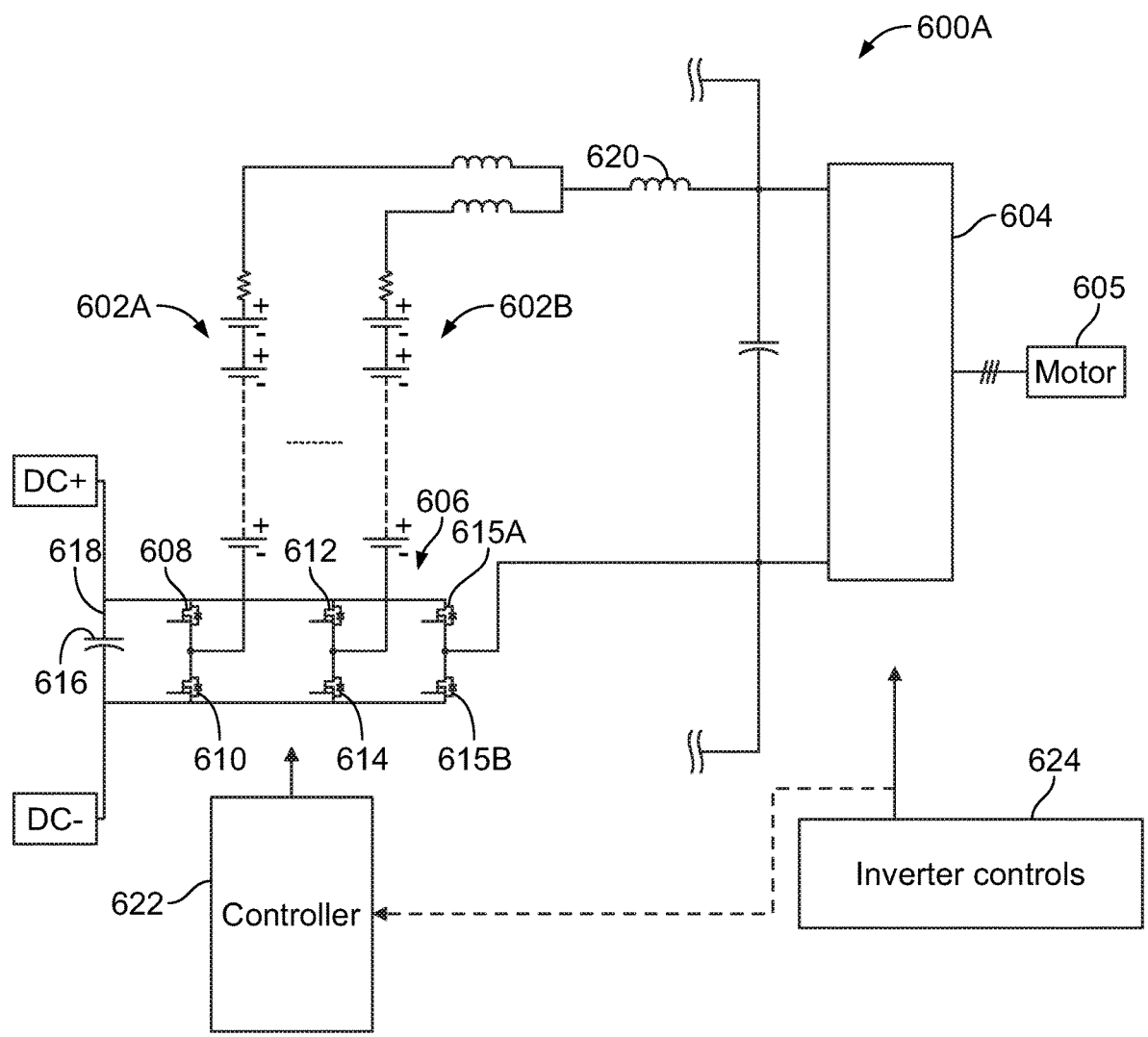
FIG. 6A illustrates a schematic diagram of an example system.

FIG. 6A illustrates an example system 600A that provides plural strings of batteries 602A and 602B that may be coupled to one another in a parallel arrangement and coupled to a converter such as an inverter 604. Similar to the example of FIG. 4, the inverter may provide an input to a motor 605 that provides motive force for a vehicle. In this example, an active filter 606 is coupled between each string of batteries and the inverter. In one example, as illustrated, a single active filter may be provided, whereas in other example embodiments, the active filter may comprise numerous active filters each coupled individually to a string of batteries.

Similar to the active filter of FIG. 4, the active filter of FIG. 6A includes a first switching element 608, second switching element 610, third switching element 615A, and fourth switching element 615B. In addition to these four switching elements, an additional set of switching elements, and specifically fifth switching element 612 and sixth switching element 614 are also provided in the active filter. In this configuration for battery 602A, switching elements 608,610,615A and 615B form the H bridge. For battery 602B, switching elements 612,614,615A and 615B form the H bridge. In this configuration elements 615A and 615B are shared by both batteries. In particular, for each string of batteries that are added to the plural strings of batteries, an additional set of switching elements may be provided. In this manner, each string of batteries may effectively be coupled to an H-bridge, or a group of four switching elements that may function to increase or decrease the applied current or voltage on the string of batteries to maintain a relatively constant applied current on the battery. Therefore, the ripple current and/or voltage may be reduced, or controlled. Consequently, the active filter may operate at a higher pulse width modulation (PWM) frequency compared to the DC bus ripple frequency.

The active filter may also include a capacitor 616 that receives an input from a direct current voltage source 618. The DC voltage source needed to provide the functionality may be a low voltage source. In one example, the DC voltage source may be 100V or less. The capacitor may store and provide energy to the first active filter. In one example, an inductor 620 may be coupled between the active filter and the inverter. The inductor may function to additionally reduce ripple current. The inductor may be provided in addition to the inductance that is already provided in the wires of the battery. Because of the active filter, the capacitor, voltage source, and inductor may be varied based on design considerations. In one example, the DC source may be eliminated. Alternatively, the inductor may be reduced in size compared to a system that does not use the active filter.

The system of FIG. 6A additionally illustrates a controller 622 that may be utilized to control the active filter and is described in greater detail herein. The controller may monitor electrical excitation signals related to the battery and inverter to determine when to actuate switching elements of the active filter. When used herein, electrical excitation signals may include voltage signals that may allow the sensor to detect the applied voltage of the battery, or current signals that may allow the sensor to detect the applied current of the battery. The controller may include sensors that directly monitor the electrical excitation signals of the battery and inverter, or may receive communication signals from an auxiliary controller 624 that may monitor the excitation signals of one of, or both of the battery and inverter. Then based on the received excitation signals, the controller may compare the signals to determine functioning of the active filter accordingly. The controller may make the determination through use of a look-up table, an algorithm, mathematical process or calculation, modeling, etc.

Figure 6B:
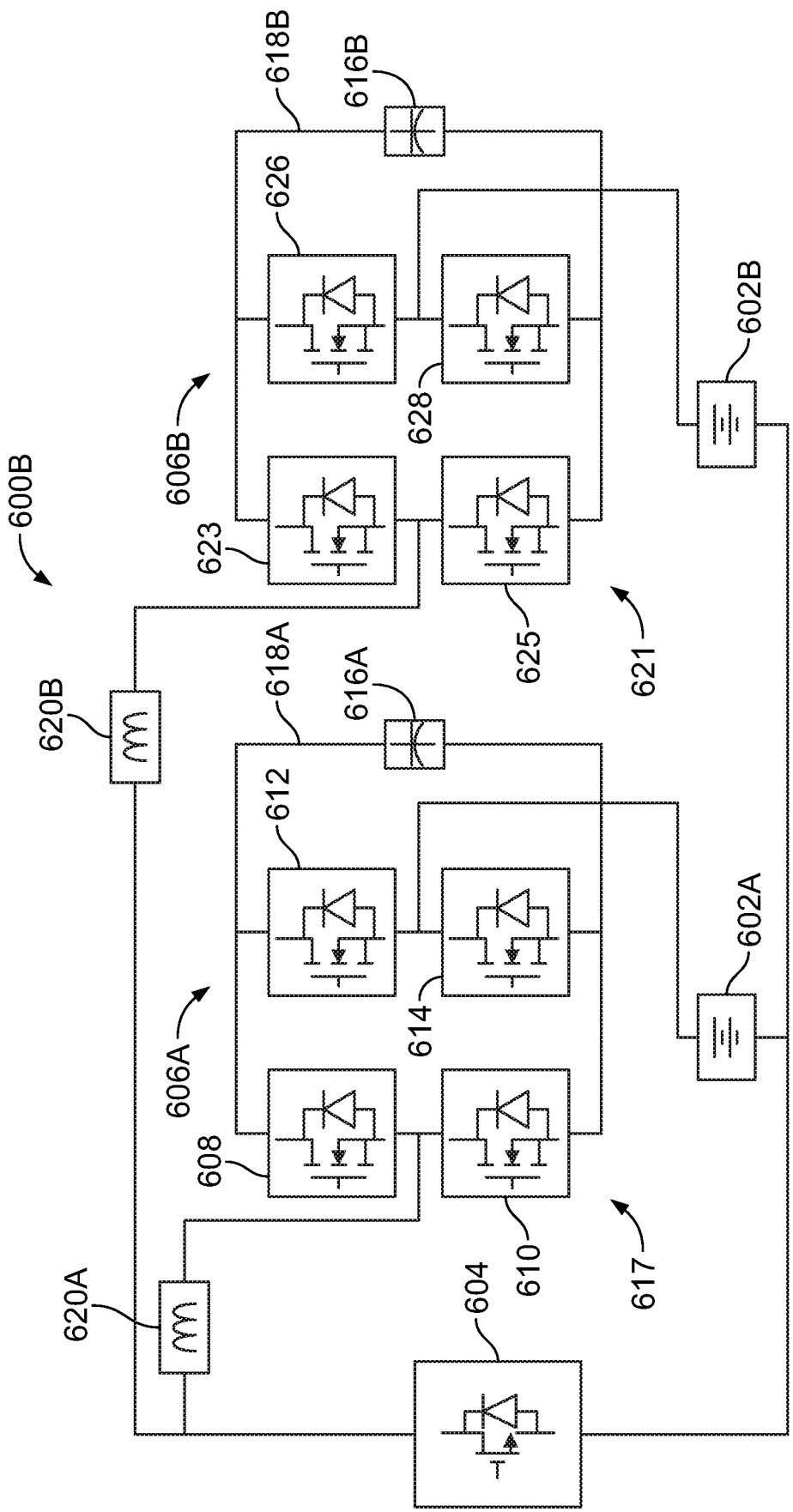
FIG. 6B illustrates a schematic diagram of an example system.

FIG. 6B illustrates an alternative example system 600B that provides plural strings of batteries 602A and 602B that may be coupled to one another in a parallel arrangement and coupled to an inverter 604. Similar to the example of FIG. 4, the inverter may provide an input to a motor that provides motive force for a vehicle. In this example, a first active filter 606A and a second active filter 606B are coupled between a respective string of batteries and the inverter.

Similar to the active filter of FIG. 4, the active filter of FIG. 6B includes a first switching element, second switching element, third switching element, and fourth switching element. Specifically, the switching elements form a first H-bridge 617 to form the first active filter. In the example of FIG. 6B, a second H-bridge 621 may be formed from a first switching element 623, second switching element 625, third switching element 626, and fourth switching element 628. To this end, additional H-bridges may be added for additional strings of batteries to provide the filtering as described.

In the example of FIG. 6B the first active filter may also include a first capacitor 616A that receives an input from a first direct current voltage source 618A. The first DC voltage source needed to provide the functionality may be a low voltage source. In one example, the first DC voltage source may be 100V or less. The first capacitor may store and provide energy to the first active filter. Similarly, the second active filter may include a second capacitor 616B that receives an input from a second direct current voltage source 618B. The second DC voltage source needed to provide the functionality may also be a low voltage source that may be 100V or less.

In the example of FIG. 6B, a first inductor 620A may be coupled between the first active filter and the inverter, while a second inductor 620B may be coupled between the second active filter and the inverter. The inductors may function to additionally reduce ripple current. The inductors may be provided in addition to the inductance that is already provided in the wires of the battery. The active filters, the capacitors, voltage sources, and inductors may be varied based on design considerations.

Figure 6C:
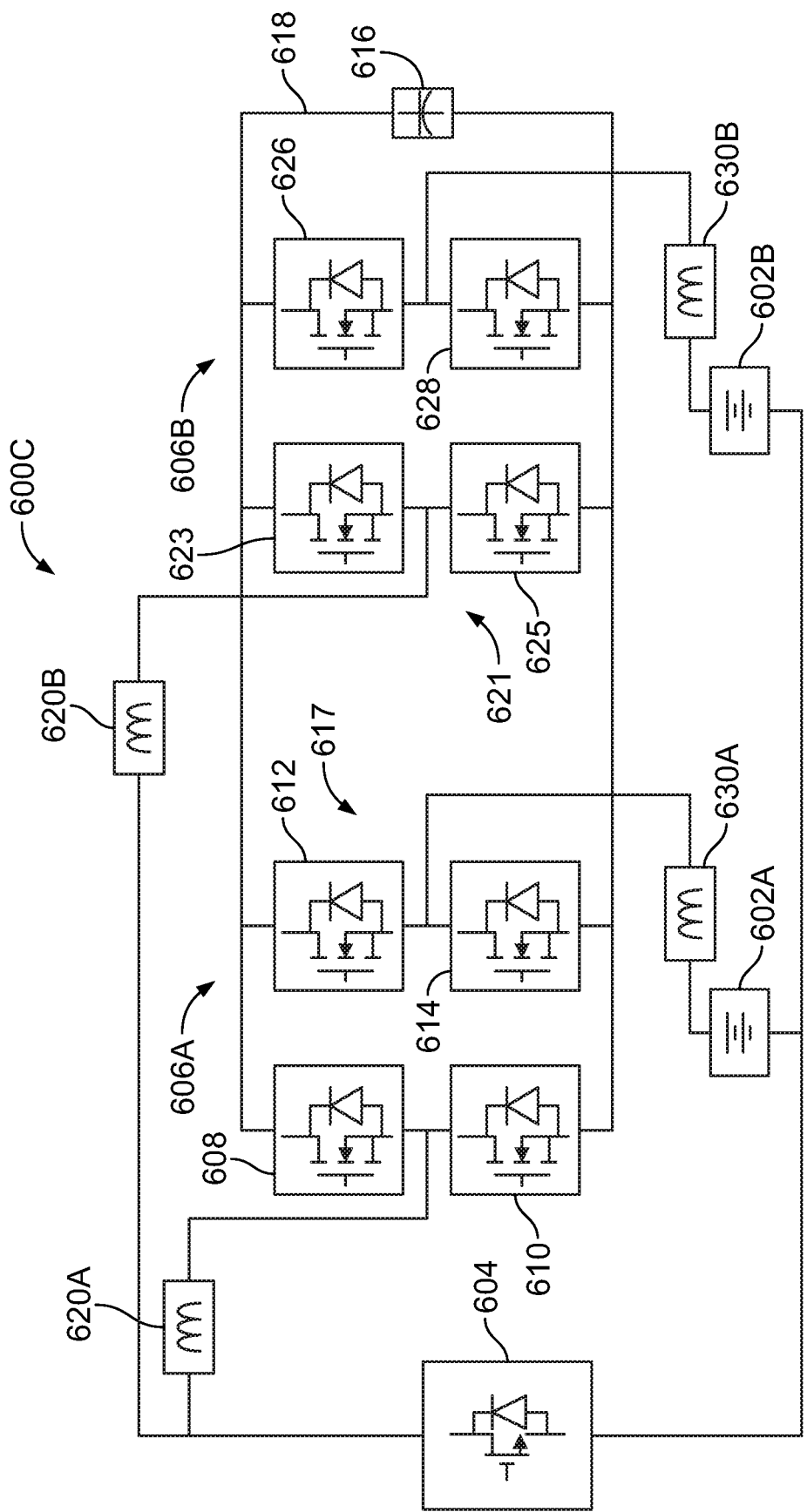
FIG. 6C illustrates a schematic diagram of an example system.

FIG. 6C illustrates a system 600C that provides a modification to the system of FIG. 6B. In the example of FIG. 6C only a single capacitor is provided that couples to both the first H-bridge and second H-bridge. In the example of FIG. 6C, a first auxiliary inductor 630A may be coupled to the first battery string prior to the first active filter, while a second auxiliary inductor 630B may be coupled to the second battery string prior to the second active filter. Thus, yet another system for filtering ripple current is provided.

Figure 7A:
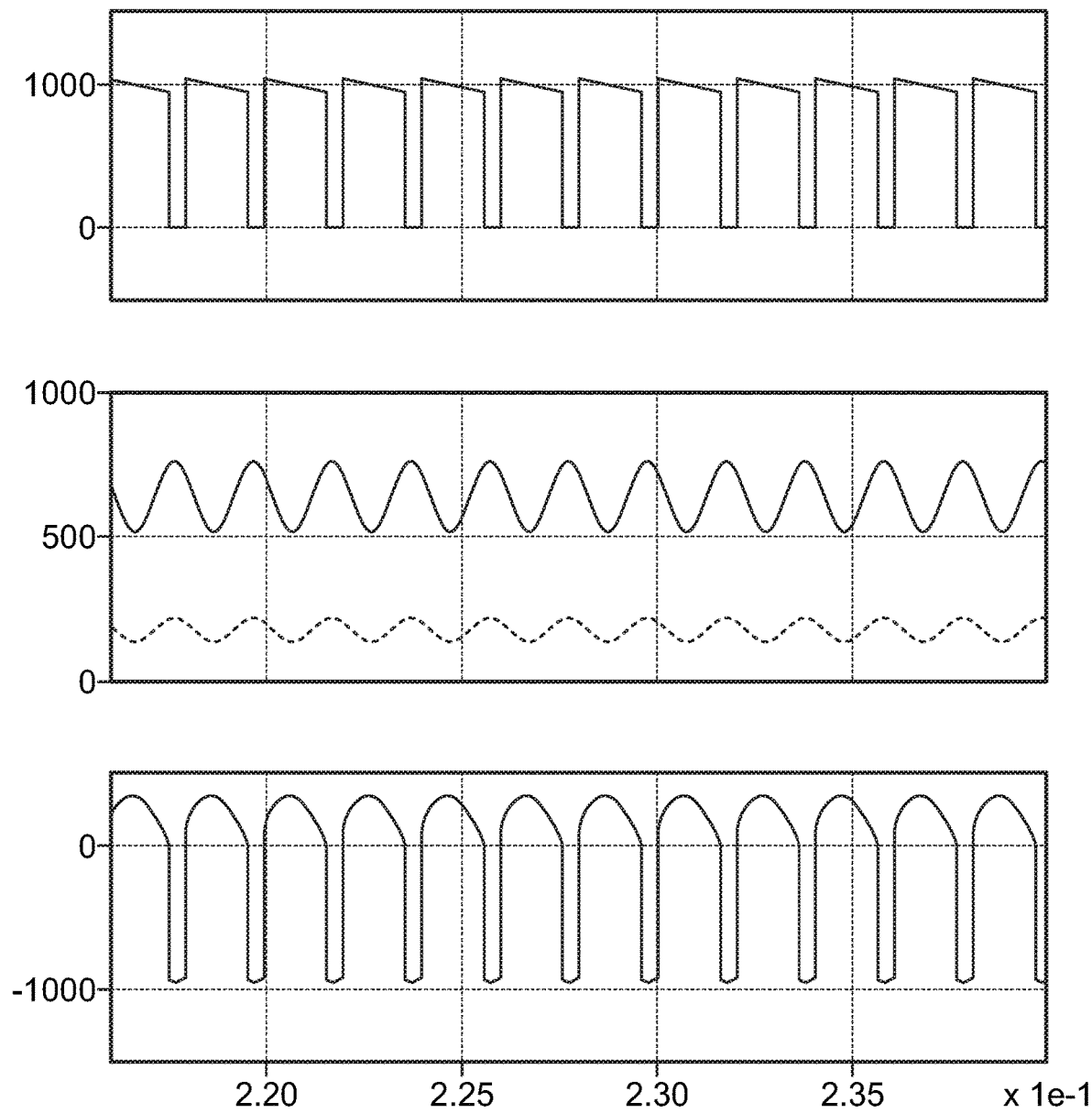
FIG. 7A illustrates a graph of current and voltage over time of a system not using an active filter.

FIG. 7A illustrates an example case of two battery strings in parallel connected directly to a DC bus where the battery strings have differing open-circuit voltages and interconnect inductances and an active filter is not utilized. In this example, the assumption may be made that the first battery string has 1000 V open-circuit (OC) and include a 100 μH inductance, while the second battery string has a 990 V OC, and a 300 μH inductance. As illustrated in the waveforms of FIG. 7A, even slight variations in the battery strings can lead to substantial differences in currents which can lead to overheating and degraded life for the overloaded strings.

Figure 7B:
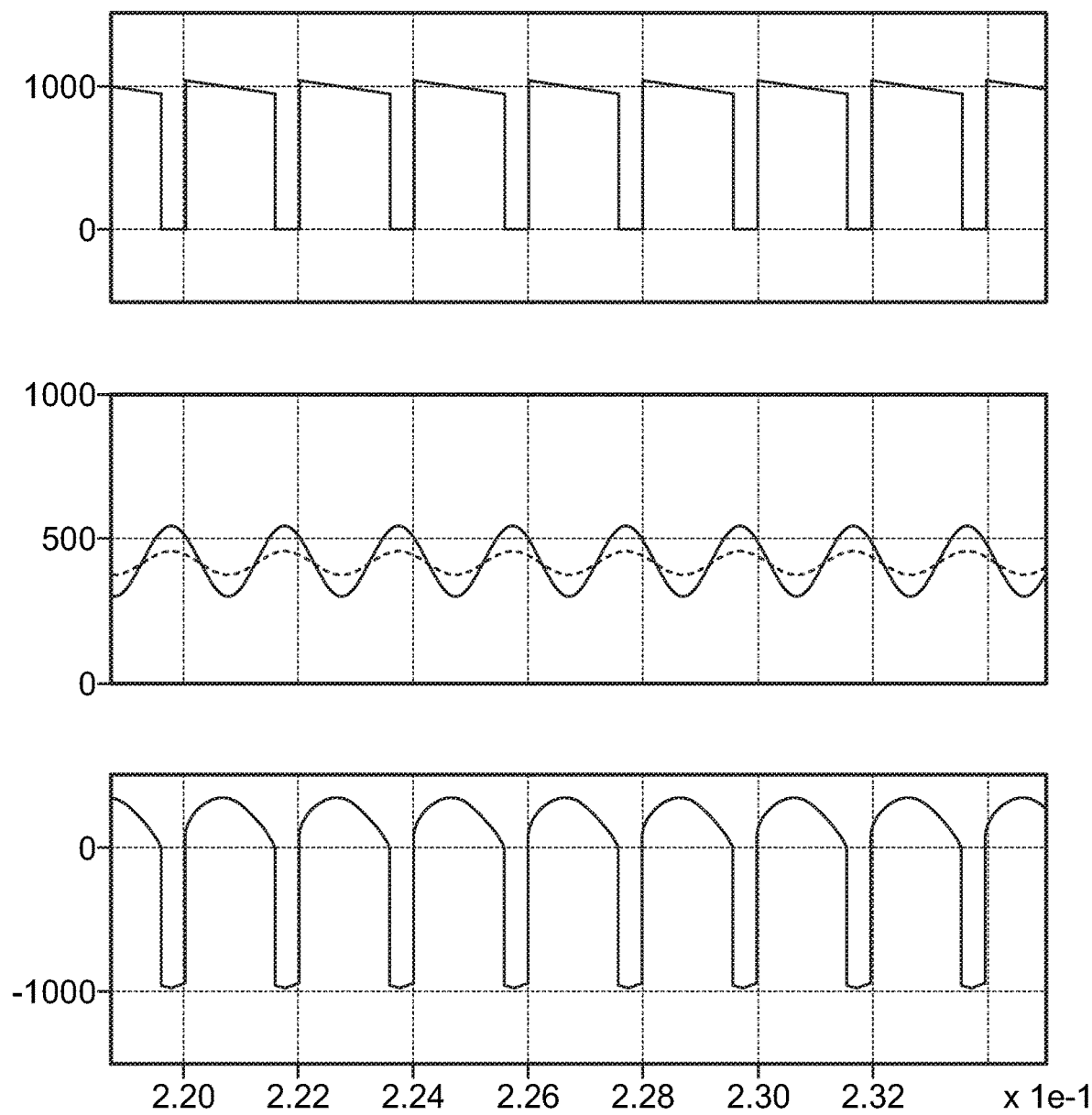
FIG. 7B illustrates a graph of current and voltage over time of a system not using an active filter.

FIG. 7B illustrates an example case where two battery strings in parallel have the same open-circuit voltages but differing series inductances without the active filter. In this example, again the assumption may be made that the first battery string has 1000 V OC and a 100 uH inductance, while the second battery string has a 990 V OC, and a 300 pH inductance. In this case, although the currents are balanced in average, the ripples are different. In addition, the system may include multiple resonant frequencies related to the inductances and DC bus capacitance that could cause instability at various operating speeds/frequencies.

Figure 7C:
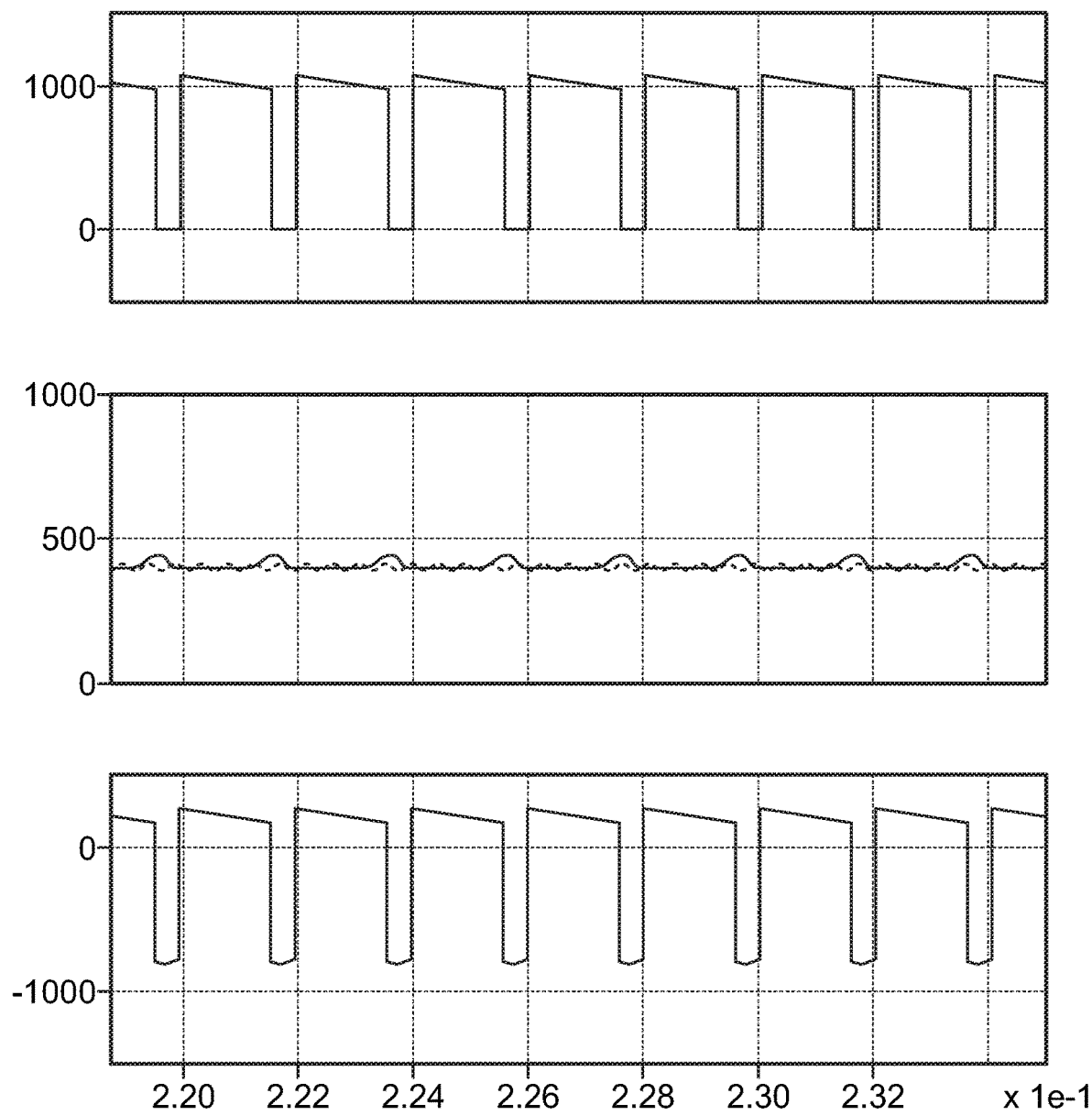
FIG. 7C illustrates a graph of current and voltage over time of a system using an active filter.
Figure 8:
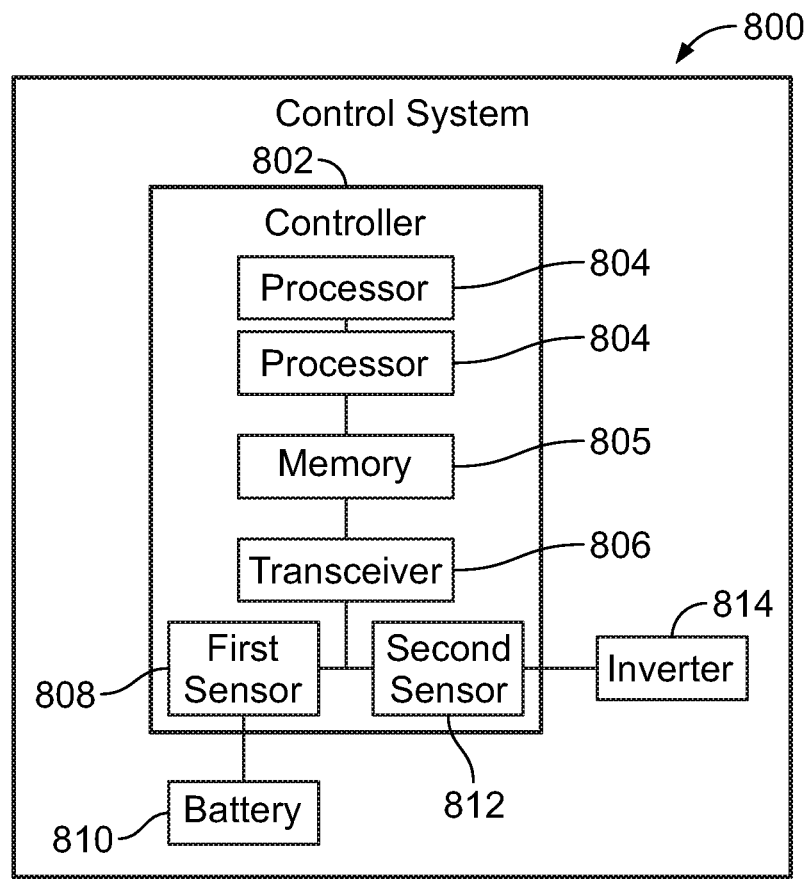
FIG. 8 illustrates a schematic diagram of a control system for a system including a battery with an active filter.

FIG. 7C in comparison to FIGS. 7A, and 7B, illustrates an example case where two battery strings in parallel have the same open-circuit voltages, but differing series inductances with the active filter. In this example, the assumption may be made that the first battery string has 1000 V OC and a 100 uH inductance, while the second battery string has a 990 V OC, and a 300 uH inductance, similar to the cases of FIGS. 7A and 7B. As a result of the active filter, balanced currents with low ripple may be achieved. The voltage rating of the active filter is dependent on the imbalance of the battery string voltages and the DC link capacitance voltage ripple. In the example case illustrated in FIG. 7C, the active filter rating is less than (<) 10% of the battery string voltages, allowing the active filter to be built with low cost switching elements, such as low cost MOSFETs. This is in contrast to a full DC-DC converter that would require a voltage rating equal to the voltage of the batteries. In addition to reduced cost, the active filter may also be smaller in size and may have lower losses than a fully rated DC-DC interface for the batteries. The smaller size also may provide advantages related to providing greater design flexibility for the system FIG. 8 provides an example control system 800 for a system utilizing a battery for energy storage. System may be a for vehicle drive, a stationary device with battery storage, etc. The example control system 800 may include a controller 802 having one or more processors 804, a storage unit such as a memory 805, and a transceiver 806 that may be used to send and receive communication signals. In one example, the transceiver may receive communication signals from an auxiliary controller of the system that monitors an electrical excitation signal of a component of the system. In one example the component may be an inverter, while in another example the component may be a battery, or a battery string. The controller may also include a first sensor 808 for measuring electrical excitation signals applied to a battery 810. The electrical excitation signals may include voltage signals that may allow the sensor to detect the applied voltage of the battery, or current signals that may allow the sensor to detect the applied current of the battery. The applied voltage or current may be taken at any given time.

The battery in one example may be a single battery, or alternatively may be a string of batteries connected in a series arrangement that have the monitored and measured applied voltage or current. Additionally, the battery may be considered plural strings of batteries that are arranged in parallel to one another. To this end, the controller may be configured to monitor and operate the system of FIG. 4, or the system of FIG. 6A. In particular, the controller may compare the current or voltage of the inverter compared to an applied voltage or applied current of a battery, and actuate the active filter to increase or decrease the applied current or applied voltage applied to the battery as described herein.

Similarly, the controller may include a second sensor 812 for measuring electrical excitation signals at the inverter 814. The electrical excitation signals may be voltage signals that permit the sensor to detect the voltage of the inverter, or current signals that permit the sensor to detect the current of the inverter. In one example, the inverter may be a traction inverter configured to provide an input for a motor that drives a vehicle.

The controller may not only monitor or receive the electrical excitation signals, the controller may also compare the signals to determine functioning of the active filter accordingly. The controller may make the determination through use of a look-up table, an algorithm, mathematical process or calculation, modeling, or the like.

Figure 9:
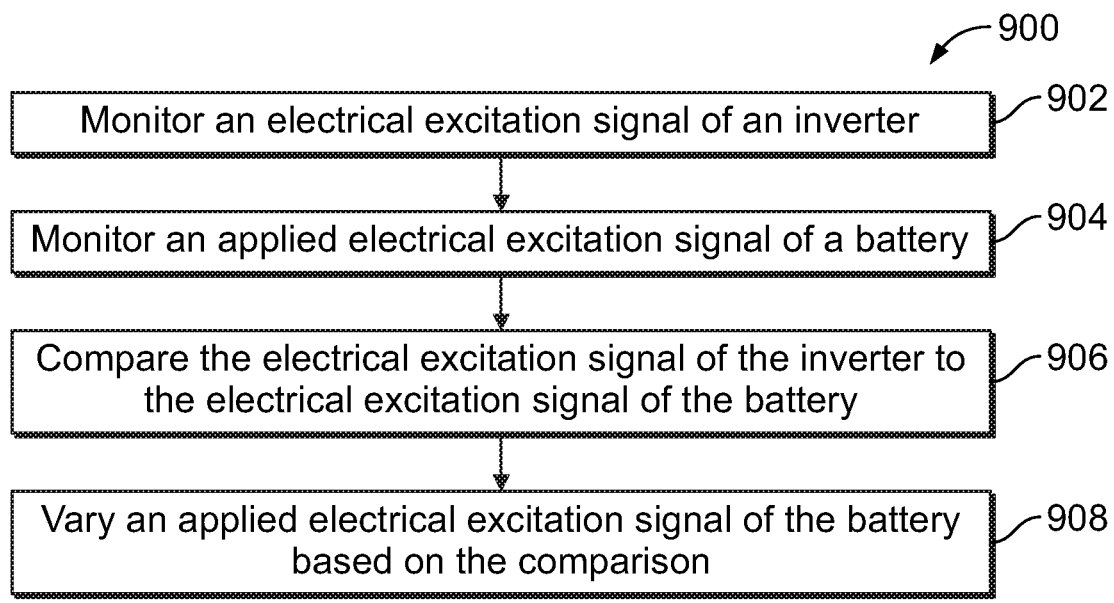
FIG. 9 illustrates a block flow diagram of a method of reducing ripple current in a system.

FIG. 9 illustrates a method 900 of reducing ripple current within a system. The method, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method may be able to be used as one or more algorithms to direct hardware (e.g., one or more aspects of the processing unit) to perform one or more operations described herein.

In one example, the system is one of the systems of FIG. 4 or 6A. The system may be an electric drive, hybrid drive, stationary device with battery storage, or the like. The system may be utilized for a vehicle system, that in one example is the vehicle system of FIG. 3. In particular, by utilizing an active filter that may be operated by a controller to increase or decrease an applied current or voltage to a battery, string of batteries, or strings of batteries that provide an input to an inverter, current ripple may be significantly reduced. The reduction may be provided while also reducing or eliminating effects related to resonance on the system. Overall, because of the system design, including use of the controller to provide the active filter, a reduction in inductor size, a reduction in cost, and an improvement in functionality may be provided.

At 902, an electrical excitation signal of an inverter is monitored. In one example, a sensor of a controller may monitor the electrical excitation signal. The electrical excitation signal in one example may be a current signal, while in another example, the electrical excitation signal may be a voltage signal.

At 904, an applied electrical excitation signal of a battery is monitored. The battery may be a single battery, a string of batteries, strings of batteries, etc. While monitoring the electrical excitation signal of the battery is presented after the monitoring of the electrical excitation signal of the inverter, the monitoring may occur simultaneously. The battery may be monitored by a sensor of the controller that monitors the electrical excitation signal of the inverter. Similar to the inverter, the electrical excitation signal that is monitored may be a voltage signal or a current signal.

At 906, the electrical excitation signal of the inverter may be compared to the electrical excitation signal of the battery. In particular, the electrical excitation signals are each monitored and compared to determine when potential ripple current may exist as a result of the differences in these electrical excitation signals. The electrical excitation signals that may be compared may be voltage signals, current signals, or the like.

At 908, an applied electrical excitation signal of the battery may be varied based on the comparison of the electrical excitation signal of the inverter, and the electrical excitation signal of the battery. Specifically, the applied current, or the applied voltage to the battery may be increased or decreased based on the comparison. In one example, the controller may actuate an active filter to open a first set of switch elements to reduce the applied current or applied voltage, or may open a second set of switch element to increase the applied current or applied voltage. In one example, the control may actuate an H-bridge of the active filter as discussed in relation to FIG. 4 or 6. Thus, by actuating the active filter, the applied electrical excitation signal to the battery may be controlled to reduce ripple current. Reduction of the ripple current provides less wear and tear on the system, allows for improved design flexibility, and improves functionality of the system.

Figure 10A:
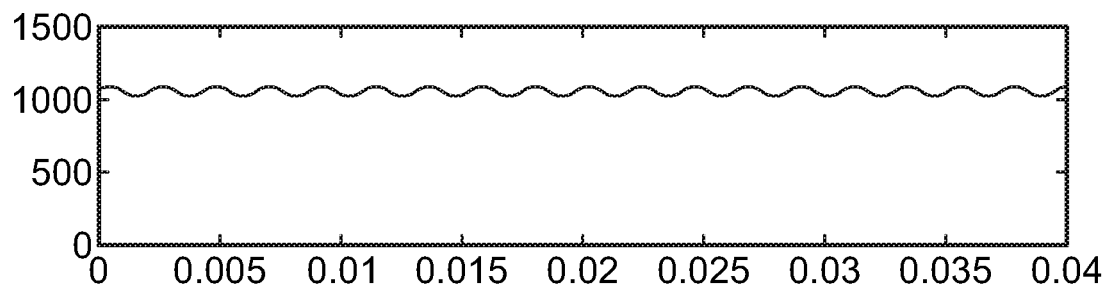
FIG. 10A illustrates a graph of voltage over time for an inverter of a system not using an active filter.
Figure 10B:
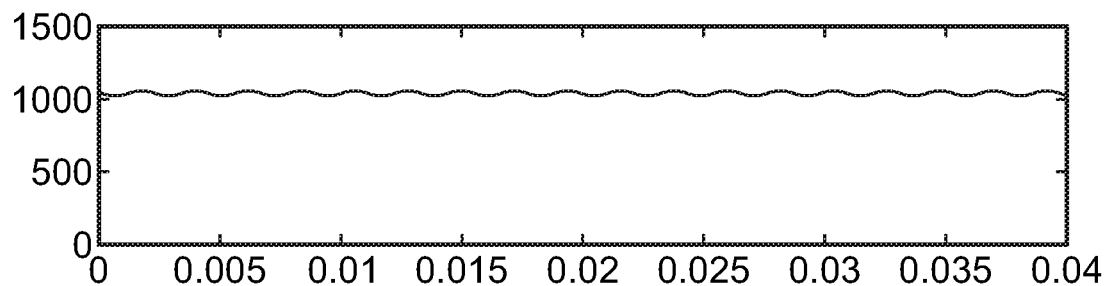
FIG. 10B illustrates a graph of voltage over time for an inverter of a system using an active filter.
Figure 11A:
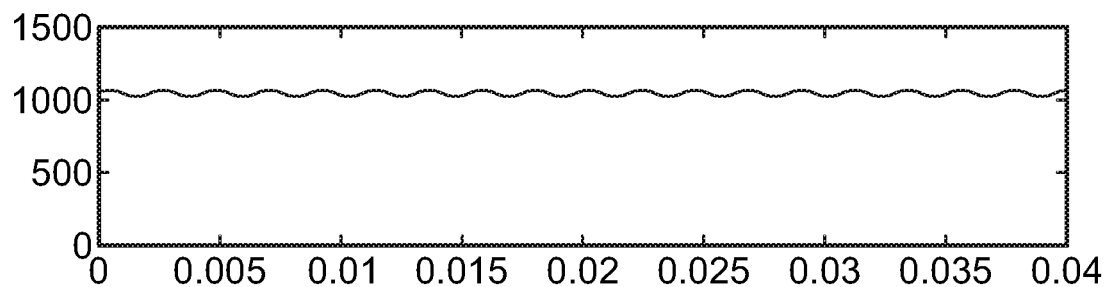
FIG. 11A illustrates a graph of voltage over time for a battery of a system not using an active filter.
Figure 11B:
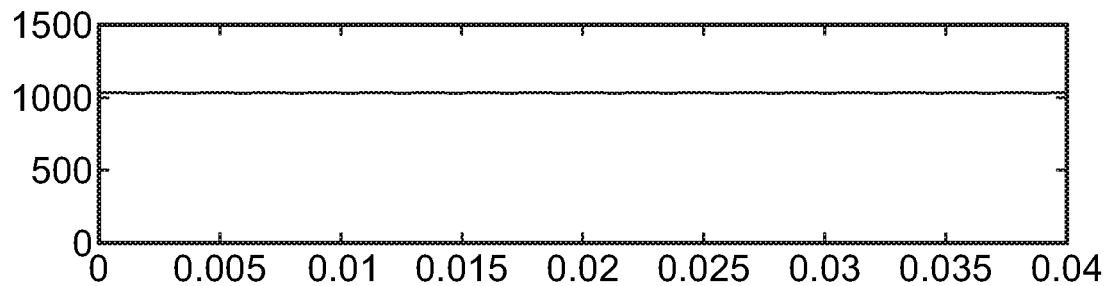
FIG. 11B illustrates a graph of voltage over time for a battery of a system using an active filter.

FIGS. 10A-14A illustrate graphs of different components of a system that does not use an active filter or method as described herein, while FIGS. 10-14B illustrate the identical system that utilizes the active filter and methodology as described herein. Specifically, FIGS. 10A-B show the inverter voltage, with the x-axis representing time in seconds and the y-axis representing voltage in volts. As can be seen, the voltage of the system using the active filter is smoother than the voltage not using the active filter. FIGS. 11A-B illustrate the battery voltage, with the x-axis representing time in seconds and the y-axis representing voltage in volts. Again, the voltage of the system using the active filter is smoother than the voltage of the system not using the active filter.

Figure 12A:
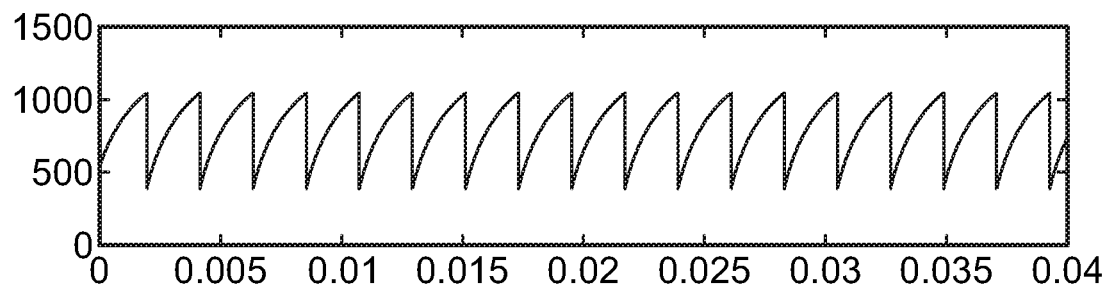
FIG. 12A illustrates a graph of current over time for an inverter of a system not using an active filter.
Figure 12B:
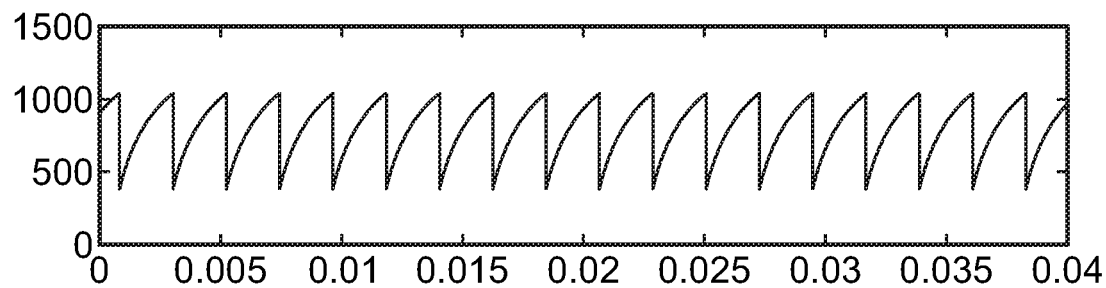
FIG. 12B illustrates a graph of current over time for an inverter of a system using an active filter.

FIGS. 12A-12B illustrate inverter current, with the x-axis representing time in seconds and the y-axis representing current in Amps. As illustrated, the Amps measured are the same, because the methodology monitors the current or voltage, but then varies the applied current or voltage of the battery to provide the improvement of the ripple current while keeping the average current through the battery substantially the same.

Figure 13A:
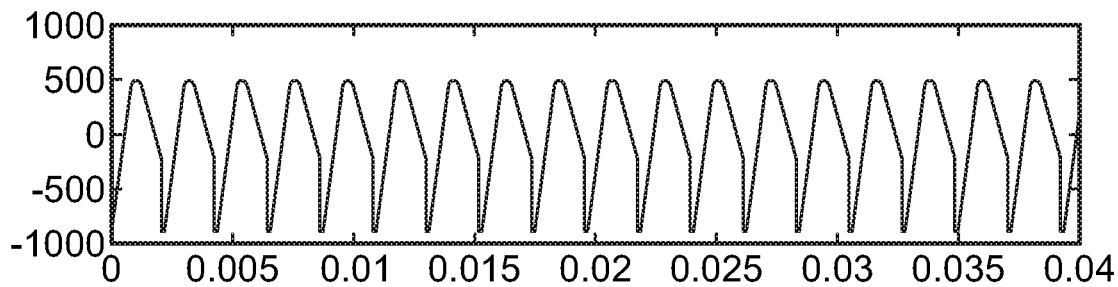
FIG. 13A illustrates a graph of current over time for a capacitor of a system not using an active filter.
Figure 13B:
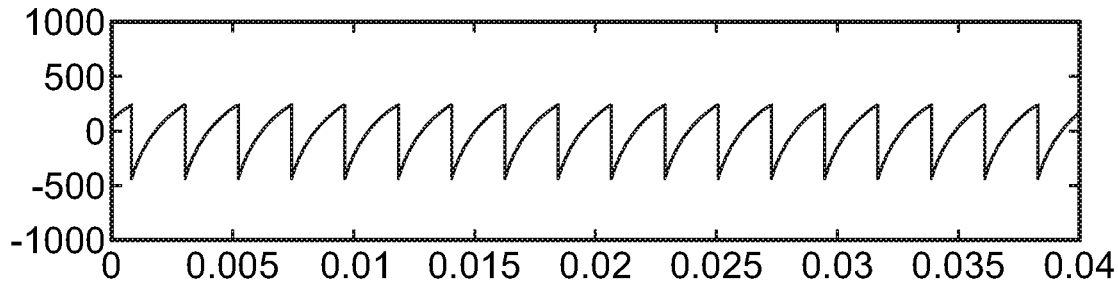
FIG. 13B illustrates a graph of current over time for a capacitor of a system using an active filter.

FIGS. 13A-13B illustrate the current at the capacitor with the x-axis representing time in seconds and the y-axis representing current in amps. As can be seen, the current of the system without the filter fluctuates significantly, going from +500 Amps to nearly −1000 Amps. The 1500 Amp fluctuation is significant fluctuation, especially compared to the current fluctuation when the active filter is utilized. As shown in FIG. 13B, the current only fluctuates between around +250 amps and around −500 amps. In both cases 13A and 13B the average current remains the same, thereby maintaining the average (DC) power transfer while reducing the ripple current and ripple (AC) power transfer. The 750 Amp fluctuation is approximately a fifty percent 50% reduction in fluctuation of the current at the capacitor. As a result, as illustrated in the comparison of FIGS. 14A and 14B, the current flowing through the battery is significantly reduced.

Figure 14A:
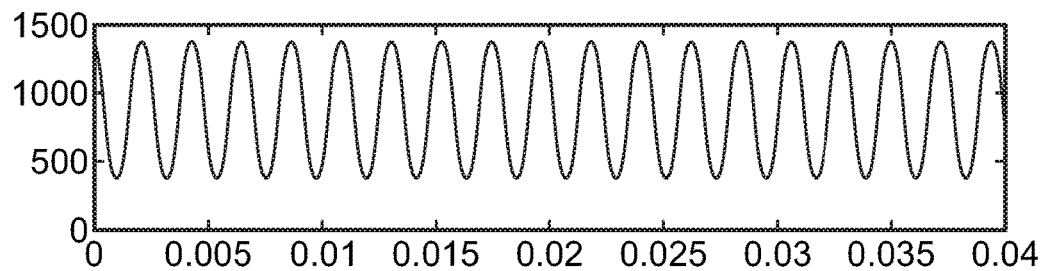
FIG. 14A illustrates a graph of current over time for a battery of a system not using an active filter.
Figure 14B:
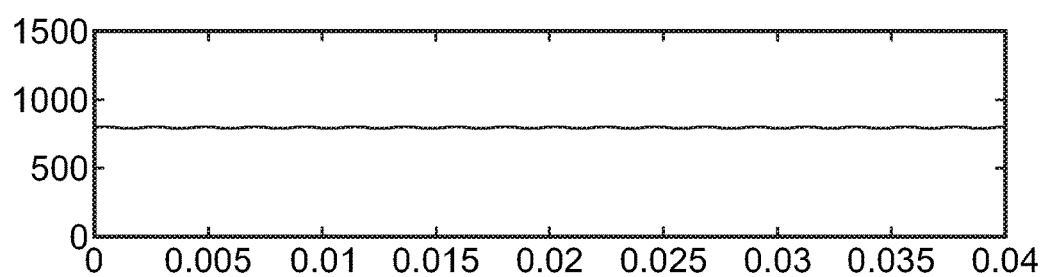
FIG. 14B illustrates a graph of current over time for a battery of a system using an active filter.

In FIGS. 14A and 14B the x-axis represents time in seconds, and the y-axis represents applied current of the battery. When the active filter and methodologies described herein are not used, a fluctuation of approximately 1000 Amps is illustrated, whereas when the active filter and methodologies described herein are used, the current remains relatively constant. This illustrates significant reduction in the ripple current by using the system with the active filter and methodologies as described herein.

Figure 15:
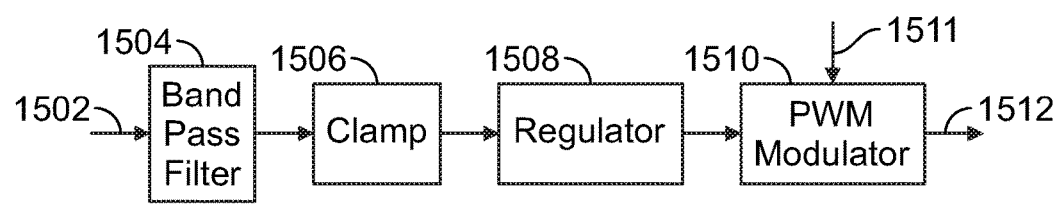
FIG. 15 illustrates a schematic diagram of a control system for a system including a battery with an active filter.

FIG. 15 illustrates an example control system 1500 for a system that includes an active filter as described herein. In one example, the system may be the system of FIG. 4 or FIG. 6A, and/or use methodologies as described in relation to FIG. 9. The control system in examples may be, or include the controller in FIG. 6A, may be or include the control system of FIG. 8, or the like.

As illustrated in FIG. 15, the control system may include a sensed battery current input 1502 that may be received by a band pass filter 1504. The band pass filter may be used to cut off low frequencies. The low frequencies may be frequencies that should not be controlled by an H-bridge of an active filter. As an example, this frequency could be 20 µHz below which all the power demand changes by the motor control are. The band pass filter may be used to cut off high frequencies. These frequencies could be beyond the control of the h bridge and may cause aliasing. As an example, this frequency could be 5 kHz for an H-bridge operating at a 20 kHz frequency.

The control system may also optionally include a clamp 1506 that receives an input from the band pass filter. The clamp may be provided to reduce the effect of large transients that cannot be controlled. Coupled to the clamp may be a regulator 1508 that may provide gain, phase and stability control compensations. In particular, the output of the regulator is used to supply the voltage needed to control the ripple current, and as a result provides the additional gain, stability, etc. as needed before providing an input to a pulse width modulation (PWM) modulator 1510.

The PWM modulator receives an input from the regulator and a DC voltage input 1511. The DC voltage input may be the voltage needed to be provided to the H-bridge of the active filter to control ripple current. In examples, the DC voltage input may be the direct current voltage source of FIG. 4 or 6A. The PWM modulator determines, or calculates the duty cycle required to control the H-bridge. In one example, when the DC voltage is 80 V and the regulator requires 48 V to control the current, the duty cycle may be 60% (48/80). In an alternative example, the duty cycle may be determined or calculated as a function of time on (t_on/Ts) and would be 80%. Consequently, the PWM modulator provides an output 1512 for commanding the H-bridge firing, or determining the switching elements that are actuated, and the timing thereof.

Figure 16:
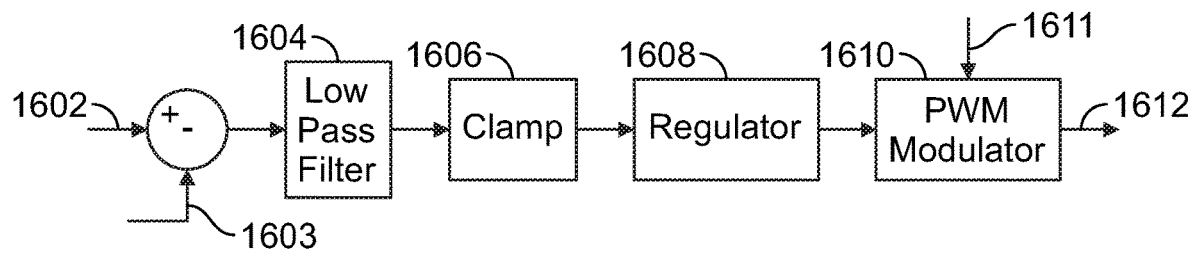
FIG. 16 illustrates a schematic diagram of a control system for a system including a battery with an active filter.

FIG. 16 illustrates yet another example control system 1600 for a system that includes an active filter as described herein. In one example, the system may be the system of FIG. 4 or FIG. 6A, and/or use methodologies as described in relation to FIG. 9. The control system may in examples may be, or include the controller in FIG. 6A, may be or include the control system of FIG. 8, or the like.

The control system of FIG. 16 illustrates a sensed battery current input 1602 and an expected traction current (signal from the drive controller) input 1603 that are used to determine an input to a low pass filter 1604. Specifically, at the low pass filter, when the expected traction current is known, the difference between battery current and traction current represents the ripple current. The expected traction current, or average battery current expected, may be calculated when the power being supplied by the traction inverter and battery voltage are known. In particular power equals voltage times current (P=IV). So, as an example, when a power is 500 kiloWatts (kW) and the battery voltage is 1000V, the expected DC current would be P/V, or 500 kW/1000V, or 500 Amps. When multiple batteries are provided, the expected current for each battery may be calculated by dividing the total power to each branch such that the battery terminal voltage is the same and the current in each branch may be determined by this terminal voltage and each battery internal voltage and series resistance.

Similar to the control system of FIG. 15, the control system of FIG. 16 may also optionally include a clamp 1606 that receives an input from the low pass filter. The clamp may be provided to reduce the effect of large transients that cannot be controlled. Coupled to the clamp may be a regulator 1608 that may provide gain and stability control compensations. In particular, the output of the regulator is used to supply the voltage needed to control the ripple current, and as a result provides the additional gain, stability, etc. before providing an input to a pulse width modulation (PWM) modulator 1610.

The PWM modulator receives an input from the regulator and a DC voltage input 1611. The DC voltage input may be the voltage needed to be provided to the H-bridge of the active filter to control ripple current. In examples, the DC voltage input may be the direct current voltage source of FIG. 4 or 6A. The PWM modulator determines, or calculates the duty cycle required to control the H-bridge as described above. Consequently, the PWM modulator provides an output 1612 for commanding the H-bridge firing, or determining the switching elements that are actuated, and the timing thereof.

Thus, provided may be a system that includes a battery coupled to a converter that provides reduced ripple current.

In an example, the system may be a drive for a vehicle that includes a battery coupled to an inverter. The system includes an active filter coupled between the converter and battery and controlled by a control system to reduce ripple current in the system. The control system maintains the applied current of the battery relatively constant to provide a significant reduction in ripple current. As a result, reduced wear and cost may be accomplished, along with enhanced design capabilities and choices.

In one or more embodiments, a system may be provided that may include a first battery, and an inverter coupled to the battery. The system may also include a first active filter including a first switch element, second switch element, third switch element, and fourth switch element. Each switch element may be coupled to the first battery or inverter. The first, second, third, and fourth switch elements may be configured to increase or decrease an applied voltage or current of the first battery.

Optionally, the inverter is a traction inverter that provides a motive force for a vehicle.

Optionally, the system may also include an inductor coupled between the first active filter and the inverter.

Optionally, the active filter may include a capacitor to store and provide energy to the first active filter.

Optionally, the first active filter may be an H-bridge and each of the first, second, third, and fourth switch elements may be a metal oxide semiconductor field effect transistor.

Optionally, the system may also include a second battery coupled in parallel with the first battery, and the first, second, third, and fourth switch elements may be configured to increase or decrease an applied voltage or current of the second battery.

Optionally, a second battery may be coupled in parallel with the first battery and may be coupled to a second active filter configured to increase or decrease an applied voltage or current of the second battery.

Optionally, the system may also include a controller operably coupled to the first active filter. The controller may be configured to monitor an electrical excitation signal of the first battery, and actuate the first, second, third, and fourth switch elements responsive to the electrical excitation signal of the first battery.

Optionally, the first active filter may include a direct current voltage source that applies a voltage of one hundred volts or less.

In one or more embodiments, a control system may be provided that may include a controller including one or more processors. The one or more processors may be configured to monitor an electrical excitation signal to a first battery, and operate an active filter coupled between the first battery and an inverter to increase or decrease an applied electrical excitation signal of the first battery.

Optionally, the one or more processors may be configured to selectively actuate switch elements of the active filter to increase or decrease the applied electrical excitation signal of the first battery.

Optionally, the one or more processors may be configured to monitor an electrical excitation signal of a second battery, and operate the active filter coupled between the second battery and the inverter to increase and decrease an applied electrical excitation signal of the second battery based on the electrical excitation signal of the secondary battery monitored.

In one or more embodiments, a system may be provided that may include a first battery, a capacitor coupled to the battery, and an inverter coupled to the battery and configured to provide a motive force to drive a vehicle. The system may also include an active filter that may include a first switch element, second switch element, third switch element, and fourth switch element. Each switch element may be coupled between the first battery and inverter. The first, second, third, and fourth switch elements may be configured to increase or decrease an applied current or voltage to the first battery.

Optionally, to vary the applied current or voltage to the battery when the voltage is greater than the battery voltage, the first switch element and third switch element may couple the capacitor in series to the inverter.

Optionally, to vary the applied current or voltage to the battery when the voltage is less than the battery voltage, the second switching element and fourth switching element may couple the capacitor in series to the inverter.

Optionally, the system may also include an inductor coupled between the active filter and the inverter.

Optionally, the active filter may be an H-bridge and each of the first, second, third, and fourth switch elements may be a metal oxide semiconductor field effect transistor.

Optionally, the system may also include a second battery coupled in parallel with the first battery, and the first, second, third, and fourth switch elements may be configured to increase or decrease an applied current or voltage to the second battery.

Optionally, the capacitor may be connected in a parallel arrangement to the first battery and the second battery.

Optionally, the system also may include a controller operably coupled to the active filter. The controller may be configured to monitor an electrical excitation signal of the first battery, and actuate the first, second, third, and fourth switch elements response to the electrical excitation signal monitored of the first battery.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a first battery;
   an inverter coupled to the first battery;
   a first active filter including a first switch element, second switch element, third switch element, and fourth switch element, each switch element coupled to the first battery or the inverter, the first, second, third, and fourth switch elements configured to increase or decrease an applied voltage or current of the first battery; and
   an inductor coupled between the first active filter and the inverter.

2. The system of claim 1, wherein the inverter is a traction inverter that provides a motive force for a vehicle.

3. The system of claim 1, wherein the first active filter includes a capacitor to store and provide energy to the first active filter.

4. The system of claim 1, wherein the first active filter is an H-bridge and each of the first, second, third, and fourth switch elements is a metal oxide semiconductor field effect transistor.

5. The system of claim 1, comprising a second battery coupled in parallel with the first battery, wherein the first, second, third, and fourth switch elements are configured to increase or decrease an applied voltage or current of the second battery.

6. The system of claim 1, comprising a second battery coupled in parallel with the first battery and coupled to a second active filter configured to increase or decrease an applied voltage or current of the second battery.

7. The system of claim 1, comprising a controller operably coupled to the first active filter, and configured to monitor an electrical excitation signal of the first battery, and actuate the first, second, third, and fourth switch elements responsive to the electrical excitation signal of the first battery.

8. The system of claim 1, wherein the first active filter includes a direct current voltage source that applies a voltage of one hundred volts or less.

9. A control system comprising:
   a controller including one or more processors configured to:
      monitor an electrical excitation signal to a first battery; and
      operate an active filter coupled between the first battery and an inverter to increase or decrease an applied electrical excitation signal of the first battery.

10. The control system of claim 9, wherein the one or more processors is configured to:
    selectively actuate switch elements of the active filter to increase or decrease the applied electrical excitation signal of the first battery.

11. The control system of claim 9, wherein the one or more processors is configured to:
    monitor an electrical excitation signal of a second battery; and
    operate the active filter coupled between the second battery and the inverter to increase or decrease an applied electrical excitation signal of the second battery based on the electrical excitation signal of the second battery monitored.

12. A system comprising:
    a first battery;
    a capacitor coupled to the first battery;
    a traction inverter coupled to the first battery and configured to provide a motive force to drive a vehicle; and
    an active filter including a first switch element, second switch element, third switch element, and fourth switch element each switch element coupled between the first battery and traction inverter, the first, second, third, and fourth switch elements configured to increase or decrease an applied current or voltage to the first battery;
    wherein to vary the applied current or voltage to the first battery when a traction voltage is greater than a battery voltage, the first switch element and third switch element couple the capacitor in series to the traction inverter.

13. The system of claim 12, wherein to vary the applied current or voltage to the first battery when a traction voltage is less than a battery voltage, the second switching element and fourth switching element couple the capacitor in series to the traction inverter.

14. The system of claim 12, comprising an inductor coupled between the active filter and the traction inverter.

15. The system of claim 12, wherein the active filter is an H-bridge and each of the first, second, third, and fourth switch elements is a metal oxide semiconductor field effect transistor.

16. The system of claim 12, comprising a second battery coupled in parallel with the first battery, wherein the first, second, third, and fourth switch elements are configured to increase or decrease an applied current or voltage to the second battery.

17. The system of claim 16, wherein the capacitor is connected in a parallel arrangement to the first battery and the second battery.

18. The system of claim 12, comprising a controller operably coupled to the active filter, and configured to monitor an electrical excitation signal of the first battery, and actuate the first, second, third, and fourth switch elements in response to the electrical excitation signal monitored of the first battery.

19. The control system of claim 9, wherein the one or more processors are also configured operate the active filter coupled between an inductor and an inverter to increase or decrease an applied electrical excitation signal of the first battery.

20. The control system of claim 9, wherein the one or more processors are also configured to vary the applied electrical excitation signal to the first battery when a traction voltage is greater than a battery voltage, and wherein the active filter has a first switch element, second switch element, third switch element, and fourth switch element, and the first switch element and the third switch element couple a capacitor in series to the inverter.

\* \* \* \* \*